H. D. WATERHOUSE.
PISTON.
APPLICATION FILED FEB. 3, 1919.
1,422,729.
Patented July 11, 1922.
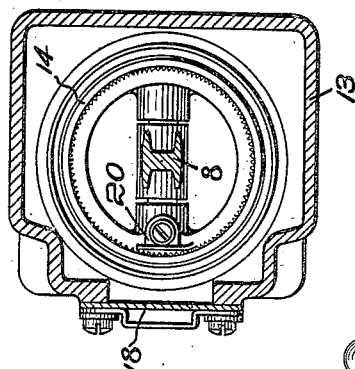
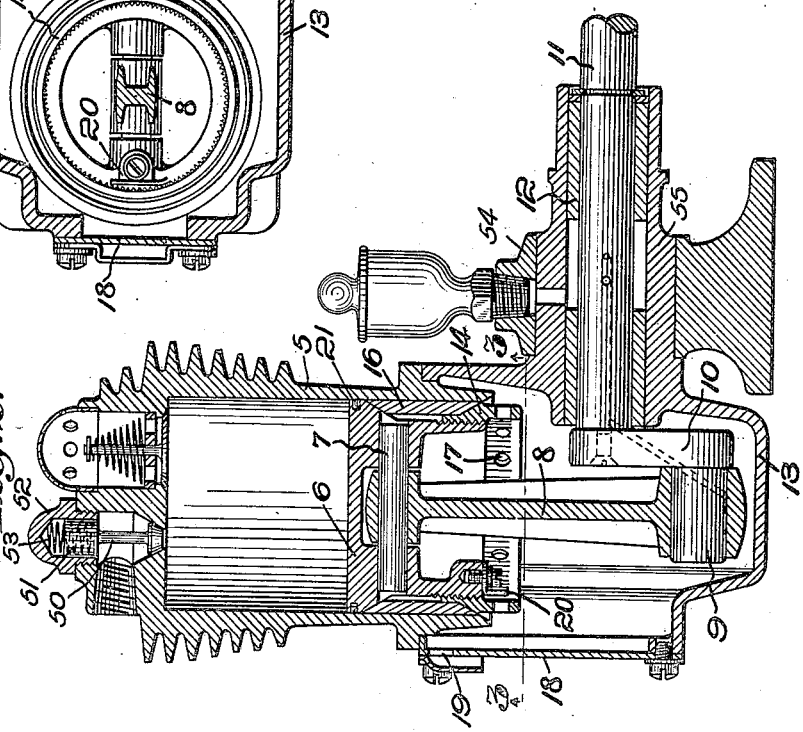
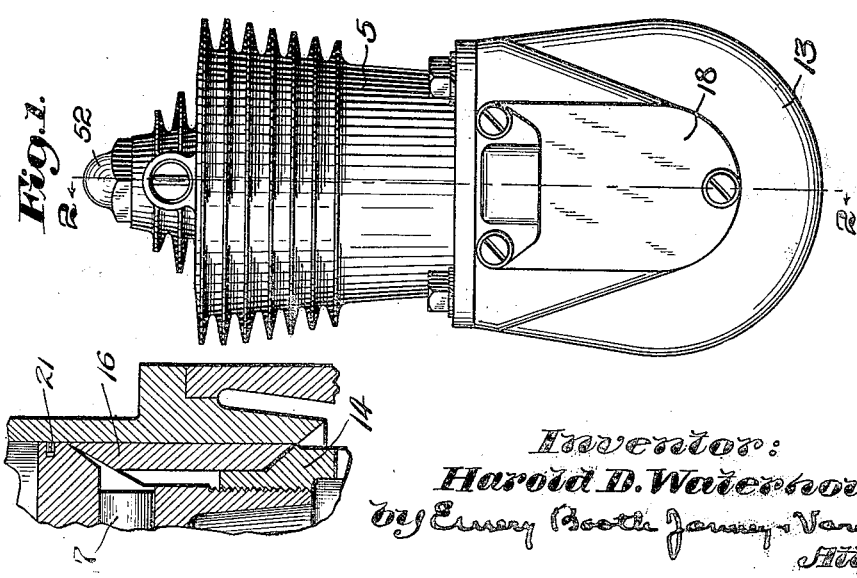
Inventor:
Harold D. Waterhouse.
by Emery Booth Janney Varney
Attys.

UNITED STATES PATENT OFFICE.

HAROLD D. WATERHOUSE, OF QUINCY, MASSACHUSETTS, ASSIGNOR TO BAY STATE PUMP COMPANY, OF BOSTON, MASSACHUSETTS, A CORPORATION OF MASSACHUSETTS.

PISTON.

1,422,729. Specification of Letters Patent. Patented July 11, 1922.

Application filed February 3, 1919. Serial No. 274,637.

*To all whom it may concern:*

Be it known that I, HAROLD D. WATERHOUSE, a citizen of the United States, and resident of Wollaston, city of Quincy, county of Norfolk, State of Massachusetts (whose post-office address is care of Lorenz & Lorenz, Hartford, Connecticut), have invented an Improvement in Pistons, of which the following description, in connection with the accompanying drawings, is a specification, like characters on the drawings representing like parts.

This invention relates to improvements in compressors, and more particularly, though not exclusively, to improvements in the construction of air pumps.

In the drawings, which show one illustrative embodiment of my invention:—

Fig. 1 is an end elevation of a preferred form of air pump;

Fig. 2 is a section on the line 2—2 of Fig. 1;

Fig. 3 is a section on the line 3—3 of Fig. 2 and

Fig. 4 is a section showing on an enlarged scale a detail of the packing construction illustrated in Fig. 2.

The present application is in part a continuation of and in part a substitute for my pending application, Serial No. 202,216, filed November 15, 1917, for an improvement in pistons and cylinders.

In the preferred form of my invention shown in the drawings, I have shown a cylinder 5 having a piston 6 reciprocable therein and connected by a wrist pin 7 and connecting rod 8 to the crank pin 9 and crank 10 mounted on any suitable crank shaft 11, preferably, as shown, rotatable in a bearing 12 secured to the base or crank-case casting 13 of the compressor.

I have shown the piston 6 supplied with a follower 14 interiorly threaded to engage threads on the bottom portion of the piston 6. The piston 6 and the follower 14 provide oppositely beveled surfaces engaging between them a continuous piston ring 16, beveled at its opposite ends to engage the inclined surfaces of the piston and follower. As hereinafter more fully described, there is a 2° difference in the angle of the bevel on the ring from the angle of the bevel on the piston and follower, so that, as the piston and follower are screwed together by rotating the follower 14, the edge portions of the piston ring 16 will be forced outwardly toward the interior wall of the cylinder 5.

The relative adjustment of the piston 6 and follower 14 to expand the continuous piston ring 16 to the desired extent may conveniently be effected by providing the bottom of the follower with a series of holes 17, which can be engaged by a pin inserted through an opening in the end of the crank-case casting 13, which is preferably covered by a plate 18, which may provide a protected breather opening 19.

In the preferred form of my invention shown in the drawings, the cylinder 5 may be assembled with its piston and parts carried thereby, including the wrist pin 7 and connecting rod 8, after which the connecting rod may be slipped over the crank pin 9 by a movement of the connecting rod through the opening provided by removal of the plate 18. After the connecting rod has been entered on the crank pin, the cylinder may be assembled with the crank-case casting by a direct downward movement thereof into a suitable bored aperture in the top of the crank-case casting. This provides a very simple, cheap and efficient method of assembly and disassembly.

The wrist pin 7 is preferably held in place by being located within and retained at the ends by the continuous piston ring 16. Undesired rotation of the follower 14 relative to the piston 16 may be opposed by the spring or other suitable friction member 20 engaging suitable milled or otherwise roughened surfaces on the interior of the follower 14.

I have found in adjusting compressors having continuous piston rings adapted to be expanded mechanically, that the follower or other expanding member should be adjusted in such a way that the friction between the piston and continuous piston ring is not excessive. This necessitates a certain amount of clearance. This clearance may vary somewhat as the temperature of the piston and cylinder is raised by heating of the air at high pressures, but the clearance may be said to be set as compared to the clearance of a split or spring piston ring. I have found that the efficiency of the pump provided with a continuous piston ring of the type described is very great at high pressures as compared with the efficiency of split piston rings, but that at lower pressures the efficiency of the split piston ring is greater than the efficiency of the continuous piston ring. Therefore, I have in the preferred form of my invention provided three split piston rings 21 mounted in a groove in the piston proper 6. These split piston rings make the compressor efficient at low pressures and temperatures, while the continuous piston ring makes the compressor efficient at high pressures and high temperatures.

The above-described combination of a continuous piston ring and discontinuous piston rings constitutes a preferred form of combined high and low pressure piston packing system, the discontinuous piston rings constituting a preferred form of low pressure piston packing means, and the continuous piston ring constituting a preferred form of high pressure piston packing means. I have found that in a continuous piston ring it is desirable that the edge portions of the ring be expanded first and, with this in view, I have made the angle of the inwardly tapered continuous piston ring two degrees less than the angle of the tapered surfaces of the piston and follower.

The preferred form of my invention is particularly well adapted for use at high pressures. I have found that at a pressure of three hundred pounds the temperature of the air discharged from the cylinder through the discharge valve 50 is so high that it quickly anneals and softens an unprotected spring. For this reason, I have provided the exhaust valve 50 with a piston 51 fitting in a cylinder 52 adapted to receive the exhaust valve spring 53 and to protect the same from direct contact with the heated air passing through the discharge passage. The piston 51 is hollowed out to receive the spring 53, and the head of the piston 51 is drilled to permit the passage of a small amount of air to and from the discharge passage proper. The piston 51 protects the spring 53 from the heat of the discharged air and, cooperating with the cylinder 52, serves as a dash-pot to prevent the discharge valve from fluttering or vibrating.

The preferred form of compressor may be mounted at any desired angle by turning the bracket 54 on the bearing casting 55, the bearing between these two parts being cylindrical and a set screw being provided to secure the two in any desired relation.

While I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. In a piston for air compressors, the combination of two separate and distinct packing means, one of said packing means comprising a continuous metallic piston ring having inwardly tapering edges, mechanical expansion means acting positively to expand said continuous piston ring, the other of said packing means comprising a resiliently expansible split piston ring.

2. A piston comprising, in combination, a piston proper, a follower and a continuous piston ring, said piston ring providing internally oppositely disposed conically tapered surfaces, and said piston and follower providing externally cooperating conically-tapered surfaces, the angle of conical taper of the ring being less than the angle of conical taper of the piston and follower, whereby the expanding force is greater adjacent the marginal portions of the ring than at points further removed from the marginal portions thereof.

3. The combination of a piston, continuous expansible piston ring and a rotatable follower for expanding said piston ring, said follower being provided with resilient friction means opposing undesired rotation of said follower relative to the piston while permitting desired rotation of said follower relative to said piston by automatic slipping of said resilient friction means.

In testimony whereof, I have signed my name to this specification.

HAROLD D. WATERHOUSE.